United States Patent [19]

Osorio

[11] 4,176,790
[45] Dec. 4, 1979

[54] COMPOSITION FOR AND METHOD OF CAUSING RAINFALL

[76] Inventor: Manuel M. Osorio, 5 Oriente 401, Tecamachalco, Puebla, Mexico

[21] Appl. No.: 944,799

[22] Filed: Sep. 22, 1978

Related U.S. Application Data

[63] Continuation-in-part of Ser. No. 882,875, Mar. 2, 1978, abandoned, which is a continuation of Ser. No. 727,123, Sep. 27, 1976, abandoned.

[51] Int. Cl.$^2$ .............................................. A01G 15/00
[52] U.S. Cl. ..................................... 239/2 R; 252/305
[58] Field of Search .................. 239/2 R, 14; 252/305

[56] References Cited

U.S. PATENT DOCUMENTS

| 3,788,543 | 1/1974 | Amand et al. .................... 239/14 X |
| 3,887,580 | 6/1975 | Patrikeev et al. ............... 252/305 X |

FOREIGN PATENT DOCUMENTS

1034408 7/1958 Fed. Rep. of Germany ............. 239/14

*Primary Examiner*—Robert W. Saifer
*Attorney, Agent, or Firm*—Albert L. Jeffers; John F. Hoffman

[57] ABSTRACT

A composition for and a method of causing rainfall in which crystals of a metallic iodide, such as lead or silver, are suspended and dispersed in a solvent, especially an organic solvent which, upon volatilization, chills the crystals suspended and distributed therein to that temperature at which the crystals are effective for causing rainfall to be initiated.

18 Claims, No Drawings

COMPOSITION FOR AND METHOD OF CAUSING RAINFALL

CROSS REFERENCE TO RELATED APPLICATIONS

This is a continuation-in-part of Ser. No. 882,875 filed Mar. 2, 1978 now abandoned which is a continuation of Ser. No. 727,123 filed Sept. 27, 1976 now abandoned.

BACKGROUND OF THE INVENTION

Use of iodide crystals, especially silver iodide crystals, for promoting rainfall is known. The present invention is particularly concerned with a greatly improved and effective composition for and method of inducing rainfall or precipitation utilizing metallic iodide crystals.

Heretofore, precipitation, especially rainfall, could be induced by seeding moisture bearing atmospheric regions with metallic iodide crystals, especially silver iodide crystals, providing the temperature was within a certain range.

According to the prior art, it has been proposed to form solutions of silver iodide and ammonium iodide with water and acetone. Upon burning of such a solution in a special combustion device, the solvent is eliminated by combustion and the iodide crystals are formed in fine and distributed state.

Such crystals, when formed in a moisture bearing region of the atmosphere, which is on the order of about five degrees Centigrade below zero, will initiate the coalescing of the moisture present into water droplets which will be large enough to form raindrops, and precipitation is thereby initiated.

The condensation of the water droplets in the described manner induces further condensation and substantial rainfall can be induced in the described manner.

The object of the present invention is the provision of a composition and method which represents a substantial improvement over prior art practices as generally outlined above.

SUMMARY OF THE INVENTION

According to the present invention, a metallic iodide, especially silver or lead iodide in the form of fine crystals, is suspended in an organic solvent such as acetone or ether, together with a dispersing agent, which may, for example, comprise sodium metasilicate.

Upon atomizing the suspension referred to in a moisture bearing atmospheric formation, such as a cloud, the solvent evaporates and releases the crystals dispersed therein while simultaneously chilling the crystals to the point that the crystals become effective for inducing the formation of water droplets and subsequent precipitation. No combustion, with the accompanying development of heat, is required so that the present invention is capable of causing precipitation under conditions wherein prior art methods involving combustion would be incapable of inducing precipitation.

According to the present invention, the metallic iodide, which is preferably in the form of silver or lead iodide, and, furthermore, in the form of fine crystals, is suspended, without being solubilized in acetone or ether or a like organic solvent with a dispersing agent such as sodium metasilicate. The dispersing agent maintains the crystals distributed in the solvent material so that the solution or suspension is uniform throughout.

The composition referred to is atomized into a cloud formation by expelling the composition under pressure through an atomizing nozzle. As the organic solvent volatilizes the chilling effect exerted thereby on the crystals of the suspension, as well as on the atmospheric region being treated, reduces the temperature and produces the evolution of the cloud into that condition wherein precipitation therefrom will commence.

A lowered temperature is important for inducing precipitation, and it is generally considered that the iodide crystals will stimulate precipitation when the atmospheric temperature is lower than about five degrees Centigrade below zero. As has been mentioned, no combustion is employed in the practice of the present invention so that no heat is developed which will interfere with the action of the iodide crystals in the stimulation of the respective cloud formation to produce precipitation.

A suitable composition for stimulating precipitation of moisture from cloud formations in accordance with the present invention comprises a suspension substantially unsolubilized of from eight to eighteen grams of either silver iodide or lead iodide in one liter of a volatile solvent consisting of ether acetone or ether. The iodide is in the formation of fine crystals and the composition includes up to about three milliliters of a 0.1 normal solution of sodium metasilicate. It should be pointed out that a higher or lower concentration of the crystals, for example, in the range of from one to twenty-five grams per liter, will obtain favorable reactions.

Modifications may be made within the scope of the appended claims.

What is claimed is:

1. The method of stimulating cloud formations to cause precipitation including introducing into a cloud formation a composition comprising a precipitation stimulating material suspended in a volatile liquid vehicle and finely dispersed therein, said precipitation stimulating material being substantially unsolubilized in the volatile liquid vehicle, said precipitation stimulating material being chilled by the evaporating liquid upon introduction into the cloud formation.

2. The method of claim 1 in which the composition is atomized directly into the cloud formation.

3. The method of claim 1 wherein the crystals comprise silver iodide crystals.

4. The method of claim 1 wherein the crystals comprise lead iodide crystals.

5. The method of claim 1 in which the liquid vehicle is an organic solvent.

6. The method of claim 5 wherein the solvent includes acetone.

7. The method of claim 5 wherein the solvent includes ether.

8. The method of claim 1 in which the crystals comprise a substance selected from the group consisting of silver iodide crystals and lead iodide crystals, and the carrier comprises a substance selected from the group consisting of acetone and ether.

9. The method of claim 1 wherein the crystals comprise a substance selected from the group consisting of silver iodide crystals and lead iodide crystals, the carrier comprises a substance selected from the group consisting of acetone and ether, and the composition includes a suspension agent for holding the crystals in a finely dispersed and suspended state in the carrier.

10. The method of claim 9 wherein said suspension agent comprises sodium metasilicate.

11. The method of stimulating cloud formations to cause precipitation including introducing into a cloud formation a composition comprising a precipitation stimulating material suspended in an organic solvent and finally dispersed therein, said precipitation stimulating material being substantially unsolubilized in the solvent, the composition being volatilized and chilled on its introduction into the cloud formation so as to enhance precipitation.

12. The method of stimulating cloud formations to cause precipitation including introducing into a cloud formation a suspension comprising crystals of precipitation stimulating material suspended in a volatile liquid vehicle, said precipitation stimulating material being substantially unsolubilized in the volatile liquid vehicle, and a suspension agent dispersed throughout the liquid vehicle for maintaining the crystals in a finally dispersed and suspended state in the liquid vehicle, said liquid vehicle chilling the crystals suspended therein by the extraction of heat from the crystals as the vehicle evaporates upon introduction into the cloud formation.

13. The method of claim 12 wherein said liquid vehicle includes an organic solvent.

14. The method of claim 12 wherein said crystals comprise a substance selected from the group consisting of silver iodide crystals and lead iodide crystals, and the solvent comprises a substance selected from the group consisting of acetone and ether.

15. The method of stimulating cloud formations to cause percipitation including introducing into a cloud formation a composition comprising a precipitation stimulating material suspended in a volatile liquid vehicle and finally dispersed therein, said precipitation stimulating material being substantially unsolubilized in the volatile liquid vehicle, said composition being introduced directly into the cloud formation without combustion of the liquid vehicle.

16. A composition for stimulating precipitation of moisture from cloud formations comprising: a suspension of from eight to eighteen grams of a fine crystal substance selected from the group consisting of silver iodide crystals and lead iodide crystals in one liter of a volatile solvent selected from the group consisting of acetone and ether, said composition including up to about three milliliters of a 0.1 normal solution of sodium metasilicate.

17. A composition for stimulating precipitation of moisture from cloud formations comprising: a suspension of from one to twenty-five grams of a fine crystal substance selected from the group consisting of silver iodide crystals and lead iodide crystals in one liter of a volatile solvent selected from the group consisting of acetone and ether, said composition including up to about three milliliters of a 0.1 normal solution of sodium metasilicate.

18. A composition for stimulating precipitation of moisture from cloud formations comprising: a suspension of from one to twenty-five grams of a fine crystal substance selected from the group consisting of silver iodide crystals and lead iodide crystals in one liter of a volatile solvent selected from the group consisting of acetone and ether, and a suspension agent, said fine crystal substance being substantially unsolubilized in the volatile solvent.

* * * * *